Dec. 11, 1923.

W. P. TURNER

STOCK WATERER

Filed Jan. 8, 1923

William P. Turner
INVENTOR

BY Victor J. Evans
ATTORNEY

H. A. LaClair
WITNESS:

Dec. 11, 1923.
W. P. TURNER
1,477,467
STOCK WATERER
Filed Jan. 8, 1923  2 Sheets-Sheet 2
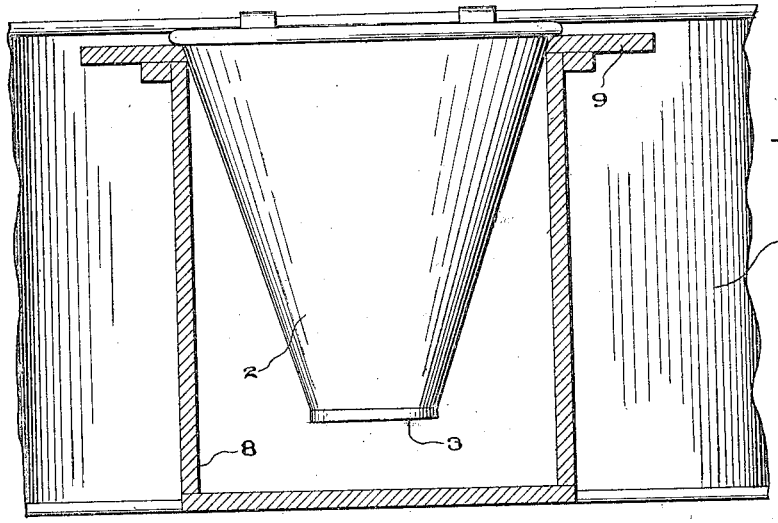
Fig. 3.
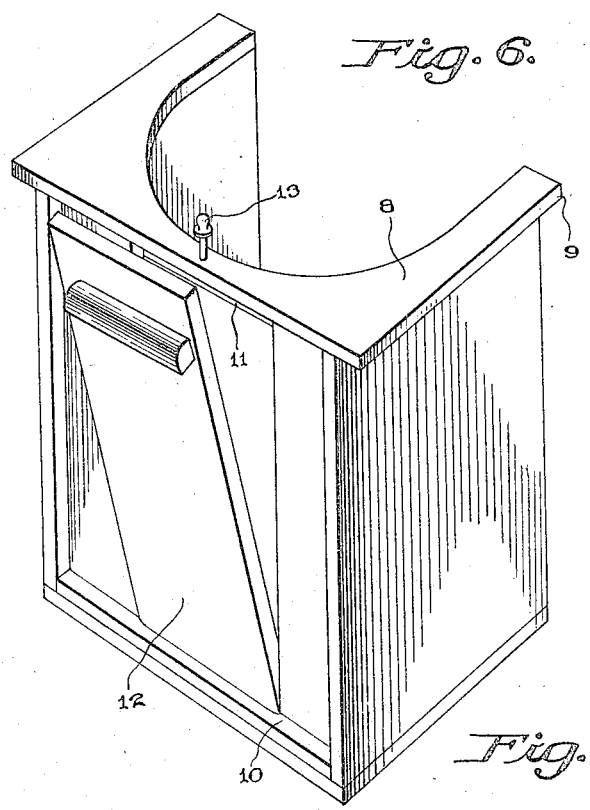
Fig. 6.
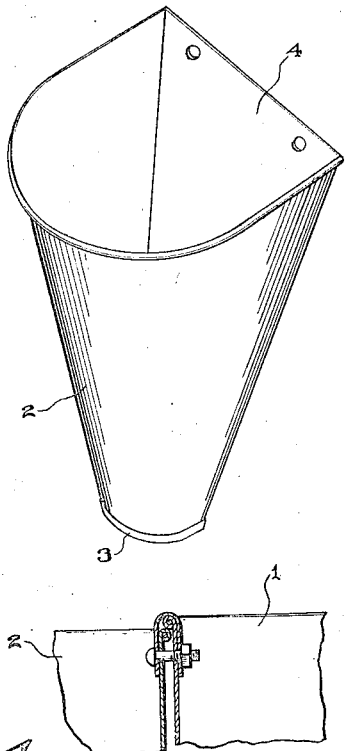
Fig. 5.
Fig. 4.
William P. Turner, INVENTOR
BY Victor J. Evans
ATTORNEY
WITNESS:
H. A. La Clair Patented Dec. 11, 1923.

1,477,467

UNITED STATES PATENT OFFICE.

WILLIAM P. TURNER, OF OAKLAND, IOWA.

STOCK WATERER.

Application filed January 8, 1923. Serial No. 611,426.

*To all whom it may concern:*

Be it known that I, WILLIAM P. TURNER, a citizen of the United States, residing at Oakland, in the county of Pottawattamie and State of Iowa, have invented new and useful Improvements in Stock Waterers, of which the following is a specification.

An object of this invention is to produce a stock watering device in which water is delivered from a tank into a basin located adjacent to the bottom of the tank, so that the basin will be constantly supplied with water from the tank even should ice form on the top of the water in the tank, while means is provided for protecting the basin and for heating the water therein in cold weather.

To the attainment of the foregoing and other objects which will present themselves as the nature of the invention is better understood, reference is to be had to the drawings which accompany and which form part of this application.

In the drawings:—

Figure 3 is a sectional view on the line 3—3 of Figure 1, looking toward the top of the basin.

Figure 4 is a sectional view on the line 4—4 of Figure 1.

Figure 5 is a detail view of the basin.

Figure 6 is a similar view of the casing.

Figures 1, 2:
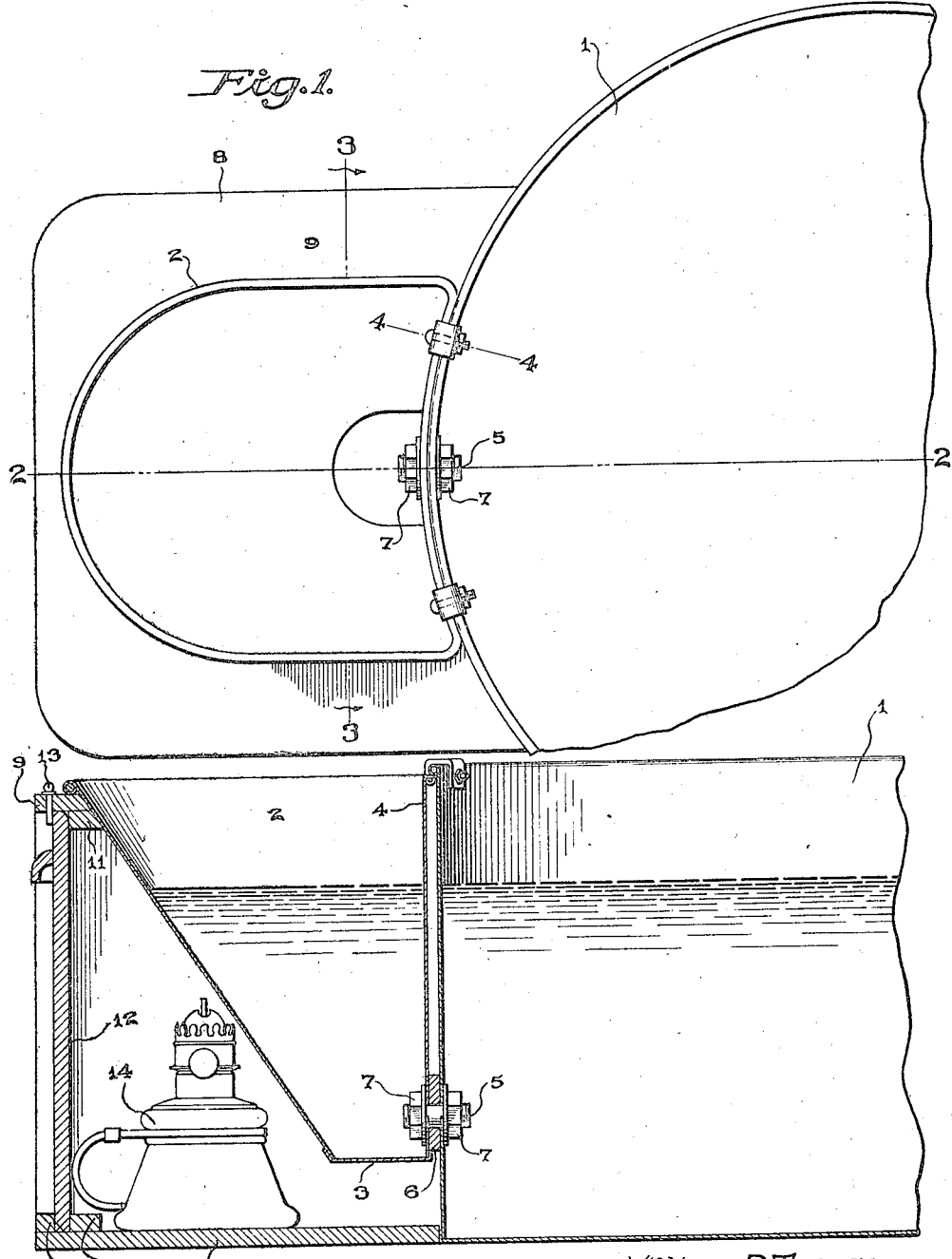
Figure 1 is a general view showing the improvement attached to a water containing tank.
Figure 2 is a sectional view on the line 2—2 of Figure 1.

Referring now to the drawings in detail, the numeral 1 designates a water containing tank. On one side, adjacent to the bottom of the tank 1, and preferably spaced from said tank, I secure a basin 2. The basin has its rear wall straight and its other walls or body flared inwardly from its beaded mouth to the bottom thereof. The bottom, indicated by the numeral 3, is flat and the rear straight wall 4, slightly above the said bottom has an opening which aligns with a similar opening in the tank. Through these openings there is passed a short pipe 5 that also passes through an opening in a washer plate 6 disposed between the rear of the basin and the side of the tank. On its ends the pipe 6 is provided with additional washers, the said ends of the pipe being threaded and being engaged by suitable nuts 7. In this manner it will be seen that a watertight joint is established between the tank and basin, and also that water from the tank will constantly fill the basin.

In order to protect the basin from contact by cattle as well as to provide a house for a lamp or similar heater for maintaining the water in the basin in heated condition in wintry weather, I provide a casing. The casing, indicated by the numeral 8 is of a substantially rectangular formation, having its rear open and its top and bottom rounded to snugly contact with the side of the tank 1. The top 9 of the casing 8 is provided with an opening for the reception of the basin when the casing is arranged next to the tank. When in such position, the beaded upper edge of the basin rests on the top of the casing. The front of the top is secured between spaced plates 10 at the bottom of the casing and against a cleat 11 at the top. The front is provided with a central opening closed by a door 12, the door being received between the spaced cleats and designed to abut against the upper cleat 11. Suitable means 13 is employed for holding the door in closed position.

Designed to be arranged in the casing, to rest on the floor thereof, directly below the flat bottom of the basin 2, there is a heating element 14. In the showing of the drawings this element is in the nature of an oil lamp, but, of course, heaters of a different character may be employed. The heater is only used during wintry weather, and it is thought that the foregoing description, when taken in connection with the drawings will fully set forth the construction and advantages of the improvement to those skilled in the art to which this invention relates without further detailed description.

Having described the invention, I claim:—

The combination with a water container having a basin connected to and receiving water from the tank, of a combined lamp house and protective housing for the basin, comprising a casing having an open inner wall anl its top provided with an opening from the inner portion thereof to receive therethrough the basin when the casing is arranged next to the tank for surrounding the basin, said casing having a closed bottom and a central opening at the front thereof, spaced transverse cleats connected to the front at the bottom of the casing, an inner cleat between the top and the front of the casing, a door designed to be received between the lower cleats and to contact with the upper cleat for closing the opening, and means on the top for engaging the door for holding the same in closed position.

In testimony whereof I affix my signature.

WILLIAM P. TURNER.